(12) United States Patent
Chuah

(10) Patent No.: US 9,315,205 B2
(45) Date of Patent: Apr. 19, 2016

(54) FOLDING MECHANISM OF BABY STROLLER

(71) Applicant: Khai Gan Chuah, Austin, TX (US)

(72) Inventor: Khai Gan Chuah, Austin, TX (US)

( * ) Notice: Subject to any disclaimer, the term of this patent is extended or adjusted under 35 U.S.C. 154(b) by 0 days.

(21) Appl. No.: 14/489,487

(22) Filed: Sep. 18, 2014

(65) Prior Publication Data

US 2016/0083000 A1 Mar. 24, 2016

(51) Int. Cl.
*B62B 7/06* (2006.01)
*B62B 7/10* (2006.01)

(52) U.S. Cl.
CPC . *B62B 7/062* (2013.01); *B62B 7/06* (2013.01); *B62B 7/064* (2013.01); *B62B 7/10* (2013.01); *B62B 2205/18* (2013.01); *B62B 2205/20* (2013.01); *B62B 2205/24* (2013.01); *Y10T 16/541* (2015.01); *Y10T 16/54048* (2015.01)

(58) Field of Classification Search
CPC .......... B62B 7/06; B62B 7/062; B62B 7/064; B62B 7/08; B62B 2205/18; B62B 2205/20; B62B 2205/22; B62B 2205/23; B62B 2205/24; Y10T 16/541; Y10T 16/546; Y10T 16/54025; Y10T 16/540257; Y10T 16/54048; Y10T 16/5406
See application file for complete search history.

(56) References Cited

U.S. PATENT DOCUMENTS

| 3,203,272 | A | * | 8/1965 | Fernberg | A47C 1/026 74/527 |
| 4,925,329 | A | * | 5/1990 | Chuang | E06C 1/32 16/332 |
| 4,928,792 | A | * | 5/1990 | Krause | E06C 1/32 16/332 |
| 5,022,118 | A | * | 6/1991 | Wan-Li | E06C 1/32 16/327 |
| 5,039,118 | A | * | 8/1991 | Huang | B62B 9/20 280/47.371 |
| 5,058,239 | A | * | 10/1991 | Lee | E06C 1/32 16/324 |
| 5,062,179 | A | * | 11/1991 | Huang | B62B 9/20 16/436 |
| 5,069,474 | A | * | 12/1991 | Tai | B62B 7/08 280/47.4 |
| 5,765,958 | A | * | 6/1998 | Lan | B62B 7/06 403/84 |
| 5,887,935 | A | * | 3/1999 | Sack | B62B 7/008 280/47.38 |
| 6,102,431 | A | * | 8/2000 | Sutherland | B62B 7/062 280/47.17 |
| 6,330,733 | B1 | * | 12/2001 | Rauschenberger | E06C 1/32 16/324 |
| 6,860,504 | B2 | * | 3/2005 | Suga | B62B 7/08 280/642 |
| 6,886,852 | B2 | * | 5/2005 | Cheng | B62B 1/045 280/47.26 |
| 7,401,803 | B1 | * | 7/2008 | Lai | B62B 7/08 280/47.38 |
| 7,617,569 | B2 | * | 11/2009 | Liao | B62B 3/12 16/297 |
| 8,661,619 | B2 | * | 3/2014 | Lu | A47C 17/86 16/321 |
| 8,696,015 | B2 | * | 4/2014 | Karremans | B62B 7/062 280/642 |
| 8,714,581 | B2 | * | 5/2014 | Fritz | B62B 7/08 280/642 |
| 8,870,213 | B1 | * | 10/2014 | Xu | B62B 7/06 280/642 |
| 2003/0077111 | A1 | * | 4/2003 | Cheng | B62B 9/20 403/101 |

(Continued)

*Primary Examiner* — Jeffrey O Brien

(57) ABSTRACT

This invention involves a set of exclusive methods of folding mechanisms for means of collapsing and opening a baby stroller. The methods aims for the compact ability, ease of use, versatility and easy manufacturing.

20 Claims, 9 Drawing Sheets

(56) References Cited

U.S. PATENT DOCUMENTS

| | | | |
|---|---|---|---|
| 2003/0085551 A1* | 5/2003 | Allen | B62B 7/062 280/642 |
| 2003/0160432 A1* | 8/2003 | Sack | B62B 7/08 280/642 |
| 2004/0222616 A1* | 11/2004 | Valdez | B62B 7/08 280/647 |
| 2006/0071451 A1* | 4/2006 | Cheng | B62B 7/008 280/642 |
| 2007/0164538 A1* | 7/2007 | Yeh | B62B 7/062 280/642 |
| 2007/0284855 A1* | 12/2007 | Lin | B62B 3/02 280/651 |
| 2008/0061533 A1* | 3/2008 | Li | B62B 7/08 280/642 |
| 2008/0079240 A1* | 4/2008 | Yeh | B62B 7/08 280/642 |
| 2009/0020984 A1* | 1/2009 | Chen | B62B 7/08 280/650 |
| 2009/0033065 A1* | 2/2009 | Kassai | B62B 7/08 280/647 |
| 2009/0288270 A1* | 11/2009 | Yamashita | A47C 1/026 16/239 |
| 2011/0084467 A1* | 4/2011 | Liao | B62B 7/062 280/642 |
| 2011/0248478 A1* | 10/2011 | Thorne | B62B 7/068 280/650 |
| 2011/0291389 A1* | 12/2011 | Offord | B62B 7/062 280/650 |
| 2012/0187660 A1* | 7/2012 | Liao | B62B 7/086 280/642 |
| 2013/0113185 A1* | 5/2013 | Zehfuss | B62B 3/02 280/647 |
| 2013/0113188 A1* | 5/2013 | Liao | B62B 7/14 280/650 |
| 2013/0147162 A1* | 6/2013 | Hsu | B62B 7/062 280/647 |

\* cited by examiner

FOLDING MECHANISM OF BABY STROLLER

BACKGROUND OF INVENTION

1. Field of Invention

The present invention relates to methods of a folding mechanism on a baby stroller to conveniently collapse a baby stroller and more particularly, is directed to baby strollers that fold with a single hand operation.

2. Discussion of Related Art

In recent years, several inventions have been developed in an attempt to produce an easy method of collapsing a stroller. One particular prior art worth mentioning is a collapsible baby stroller by Sutherland et al. (U.S. Pat. No. 6,102,431) involving a folding mechanism that uses two knife blade followers to engage the spring loaded piston in an unfolded position. With this present invention followers are not necessary therefore reducing extra parts to be made. This will reduce manufacturing cost and time. This invention relates to the folding mechanism of a collapsible baby stroller, having a set of mesh gears, protrusion bar, receptor, locking tabs and a locking mechanism.

SUMMARY OF THE INVENTION

The present invention is a series of methods of a folding mechanism on a baby stroller, which improve the ease of folding a baby stroller and lessen the bulkiness of the stroller for storage. The invention of the folding mechanism involves two gear components moving simultaneously in opposite directions to guide the movement of the folding mechanism. The two gear components are further connected to the two main parts of the stroller—the front wheel(s) and the handle bar(s), by means of extensions. One gear component is connected to the extension to the front wheel(s), the other is connected to the extension to the handle bar(s). The invention further includes a protrusion bar and locking tabs respectively on each extension to halt the movement of the two gear components until the locking mechanism is disengaged. In addition, a stopper of the locking mechanism is added to constrain the movements of both gear components. The locking mechanism is further connected to the extension of the rear wheels. When the locking mechanism is disengaged, the protrusion bar slides into the slot of a receptor found along the adjacent gear component. The protrusion bar continues its smooth passage entering and exiting the slot of the receptor as the stroller continues to fold until the front wheel and handle bar extensions are parallel to each other.

DETAILED DESCRIPTION OF INVENTION

Figure 1:
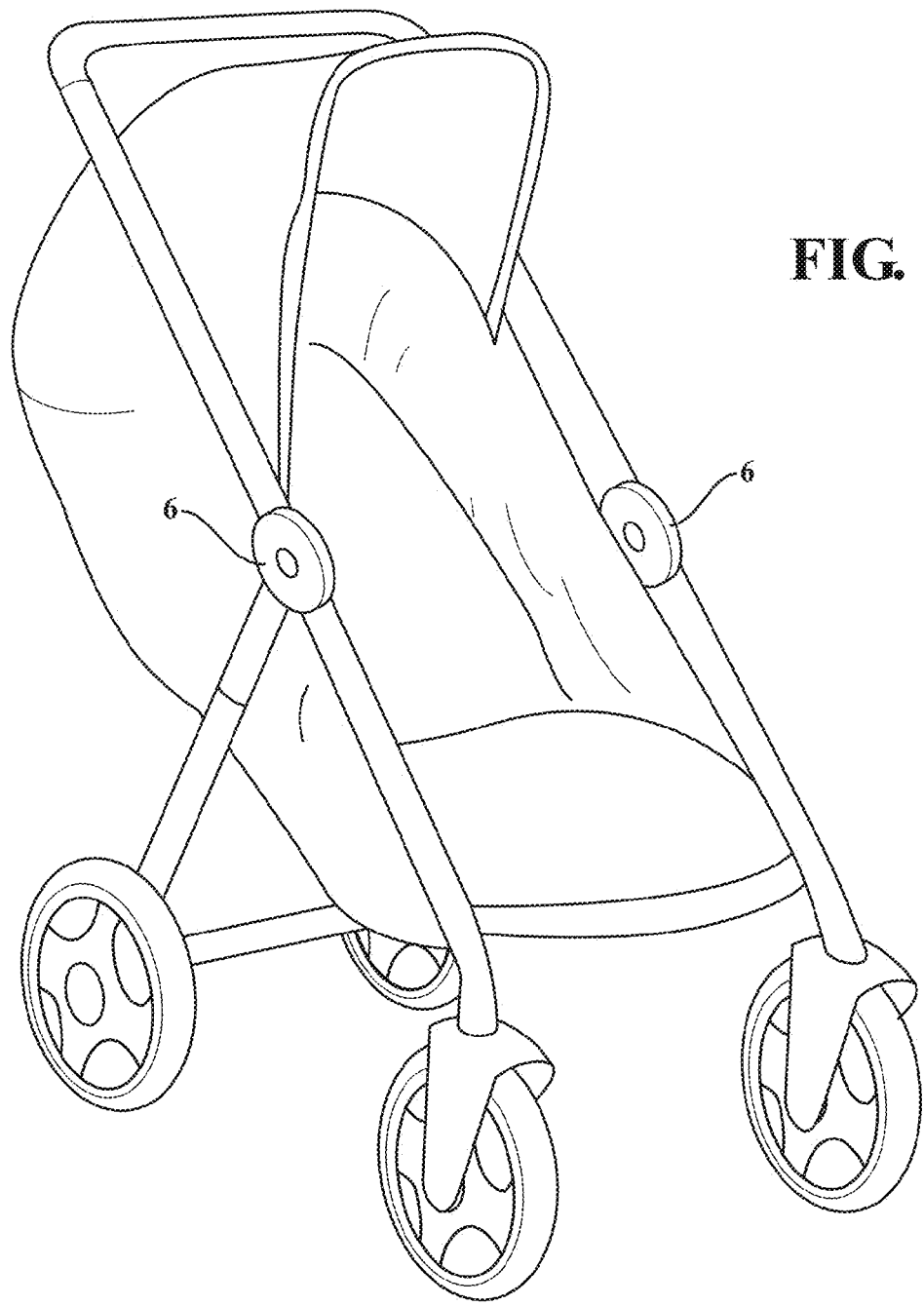
FIG. 1 is an isometric view of an exemplary implementation of a baby stroller embodying the present invention shown in an unfolded state.
Figure 2:
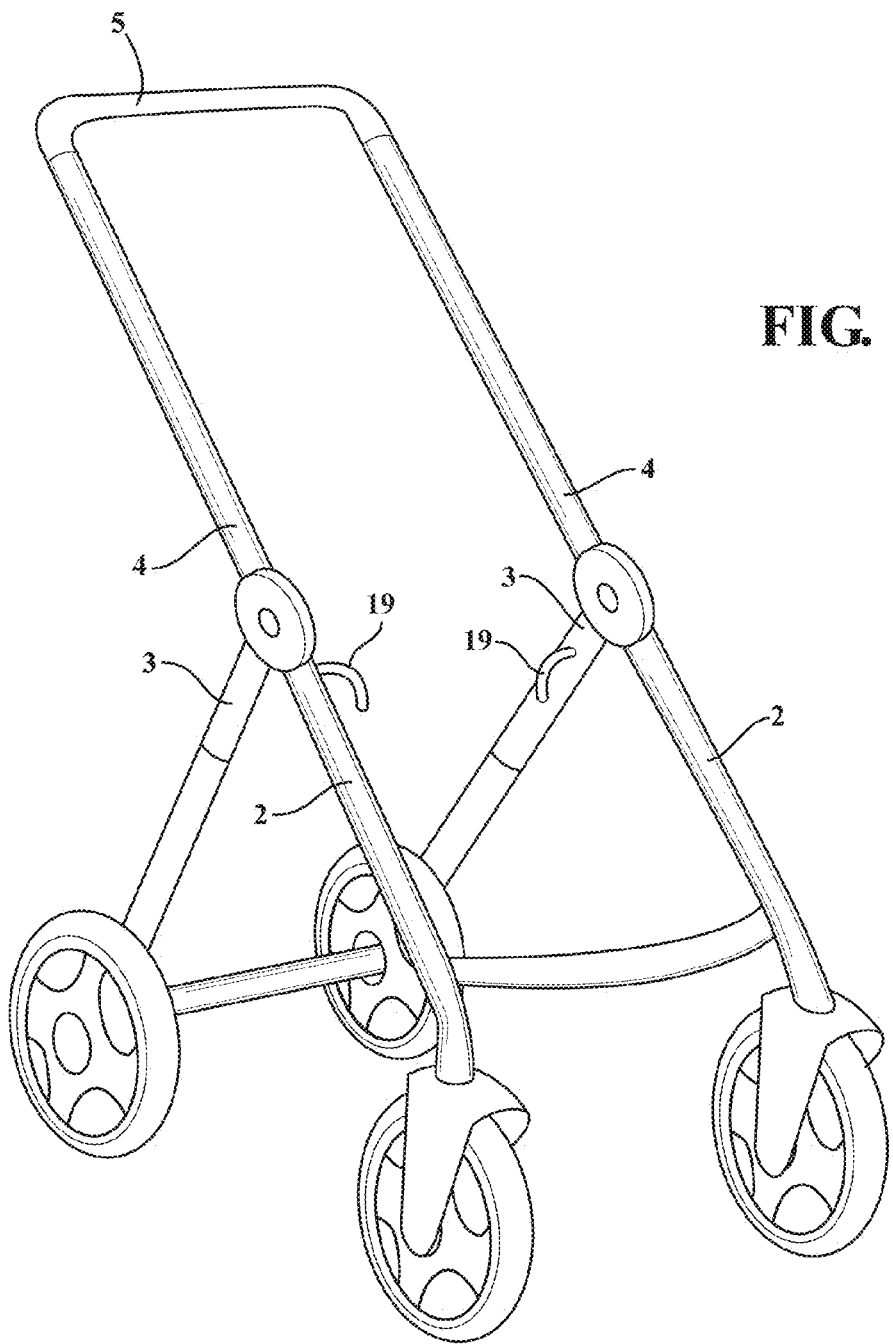
FIG. 2 is an isometric view of the stroller frame of FIG. 1.

The stroller frame is made up of three sections: front wheel support 2, push handle support 4, and rear wheel support 3 (See FIG. 2). The left and right front wheels are mounted to the end of the front wheel support 2. The stroller push handle 5 is mounted to the left and right of the push handle support 4 and the left and right of rear wheels are mounted to end of the rear wheel support 3. These sections are hinged by a folding mechanism 6 (See FIG. 1) placed on both sides of the stroller. The stroller, in the unfolded position depicted in FIG. 3, has the front wheel support 2 and push handle support 4 aligned in a straight line. Conversely, the stroller in the folded position is depicted in FIG. 4.

Figure 10:
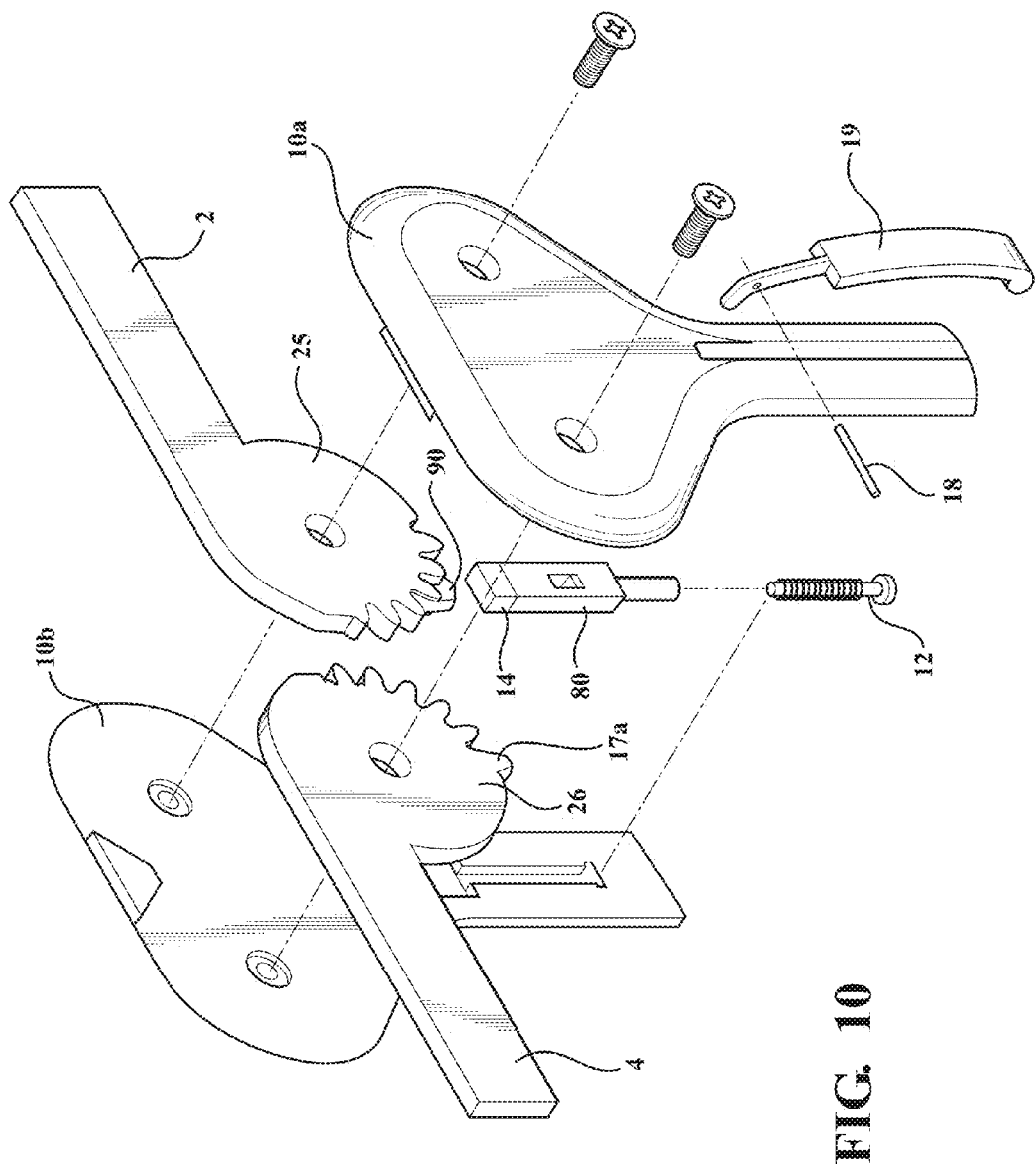
FIG. 10 is an exploded view corresponding to FIG. 9 of the folding mechanism.

The folding mechanism 6 consists of two outer casing 10a, 10b, two gear components 25, 26 and a locking system 80 (See FIG. 10). Both gear components 25, 26 are mounted on pivots of the folding mechanism 6. The gears simultaneously guide the movements of the front wheel support 2 and push handle support 4, so both move toward the rear wheel support 3 during folding, or both move away from the rear wheel support 3 for unfolding.

Figure 5:
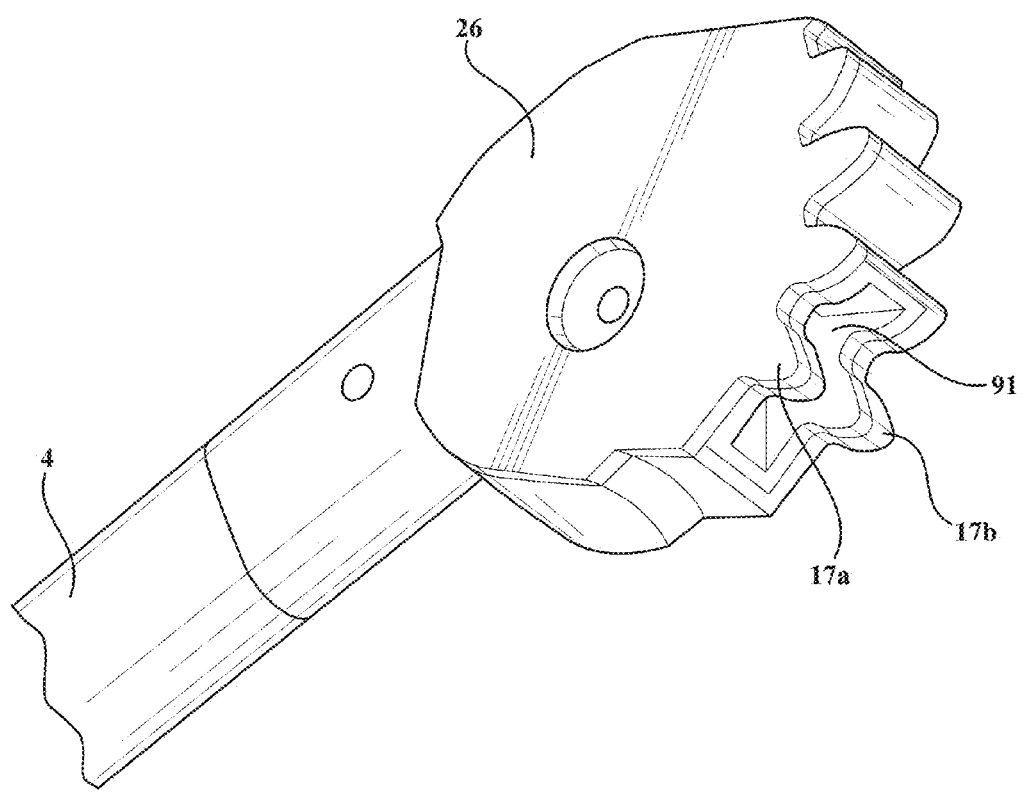
FIG. 5 is an enlarged fragmentary view of the gear component with receptor and gear locking tabs.
Figure 6:
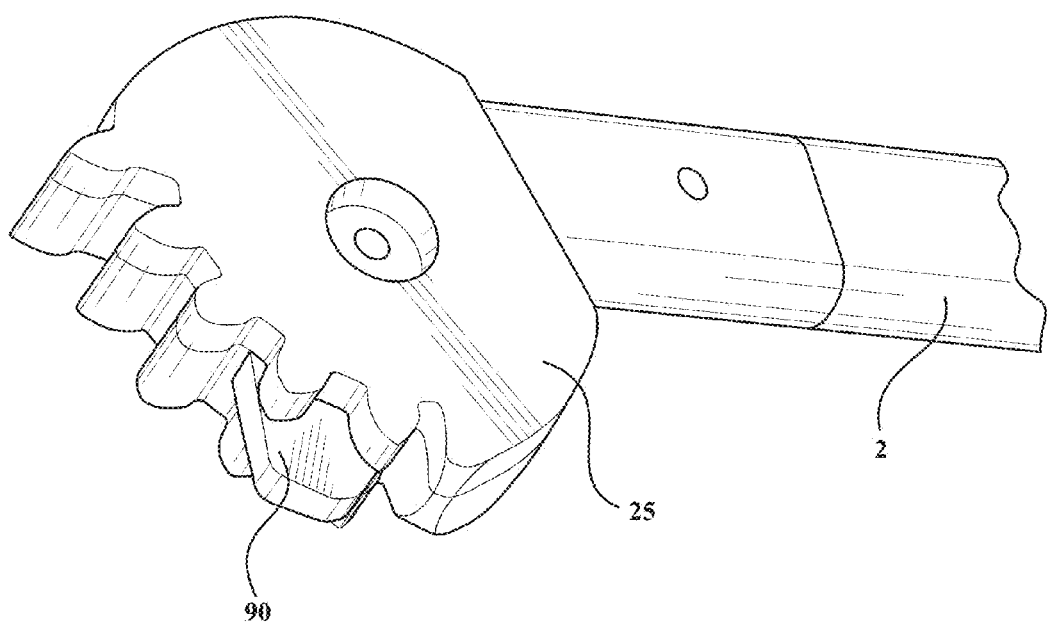
FIG. 6 is an enlarged fragmentary view of the gear component with protrusion bar.

Unlike traditional mesh gears, the gear components have been modified whereby the gear component 25 has a protrusion bar 90 (See FIG. 6), while gear component 26 has a receptor 91 (See FIG. 5).

Figure 8:
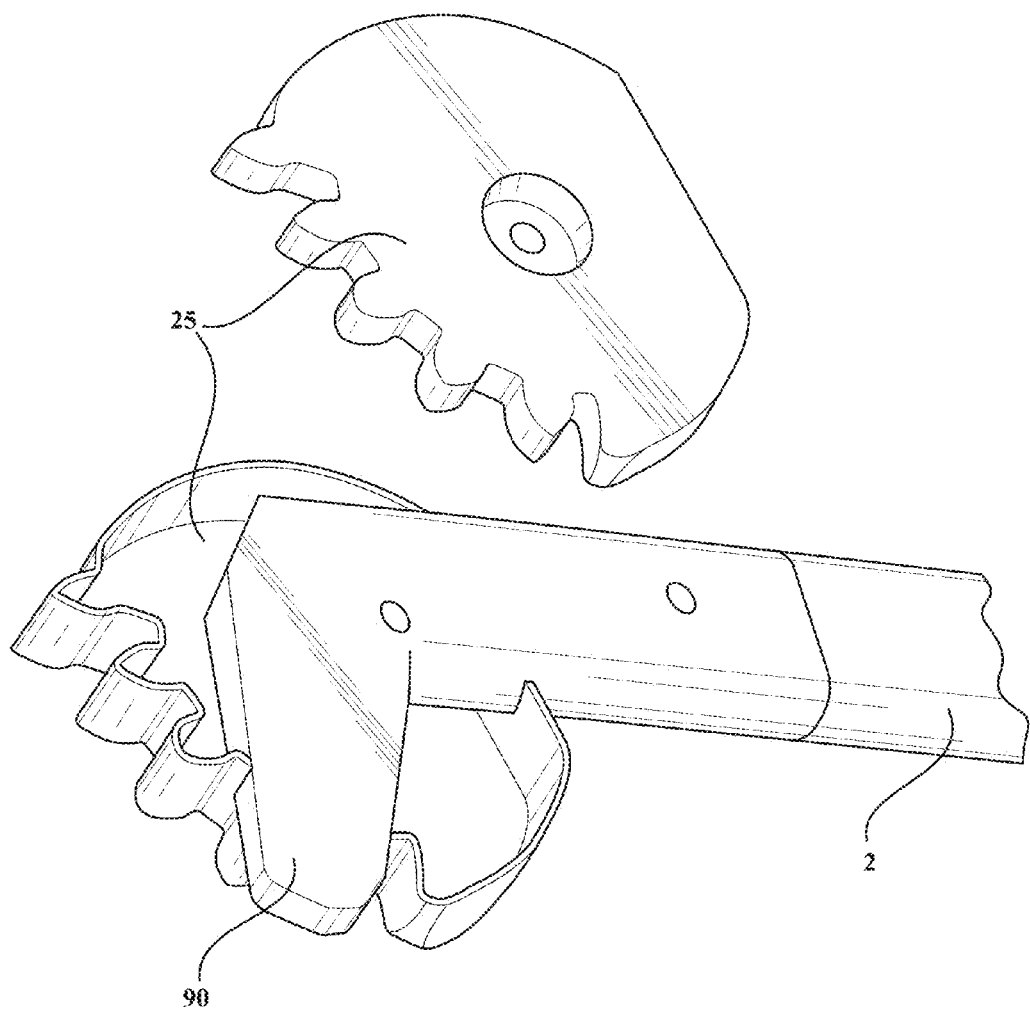
FIG. 8 is an exploded view of the gear component with protrusion bar.

The protrusion bar 90 is positioned within gear component 25 (See FIG. 8). The protrusion bar 90 further extends to become the push handle support 4. The protrusion bar 90 of gear component 25 is a separate entity. The protrusion bar 90 is an elongated structure, with its height greater than the teeth of the gear component 25. Since the height of protrusion bar 90 is larger than the rest of the gear teeth of gear component 25, the protrusion bar 90 is overtly projected out from the gear component 25.

Since the protrusion bar 90 is overtly projected out from the gear component 25, it will impede the movement of the gear components 25, 26, and will not allow the folding mechanism to function properly. The receptor 91 (See FIG. 5) of gear component 26 is therefore designed explicitly to allow the protrusion bar 90 to pass through during the motion of the gear components 25, 26. The protrusion bar 90 glides in and out of the receptor 91, which is found in the gear component 26, as the two gear components 25, 26 are in motion during the folding and unfolding process of the stroller. The receptor 91 of gear component 26 is a separate entity.

Figure 7:
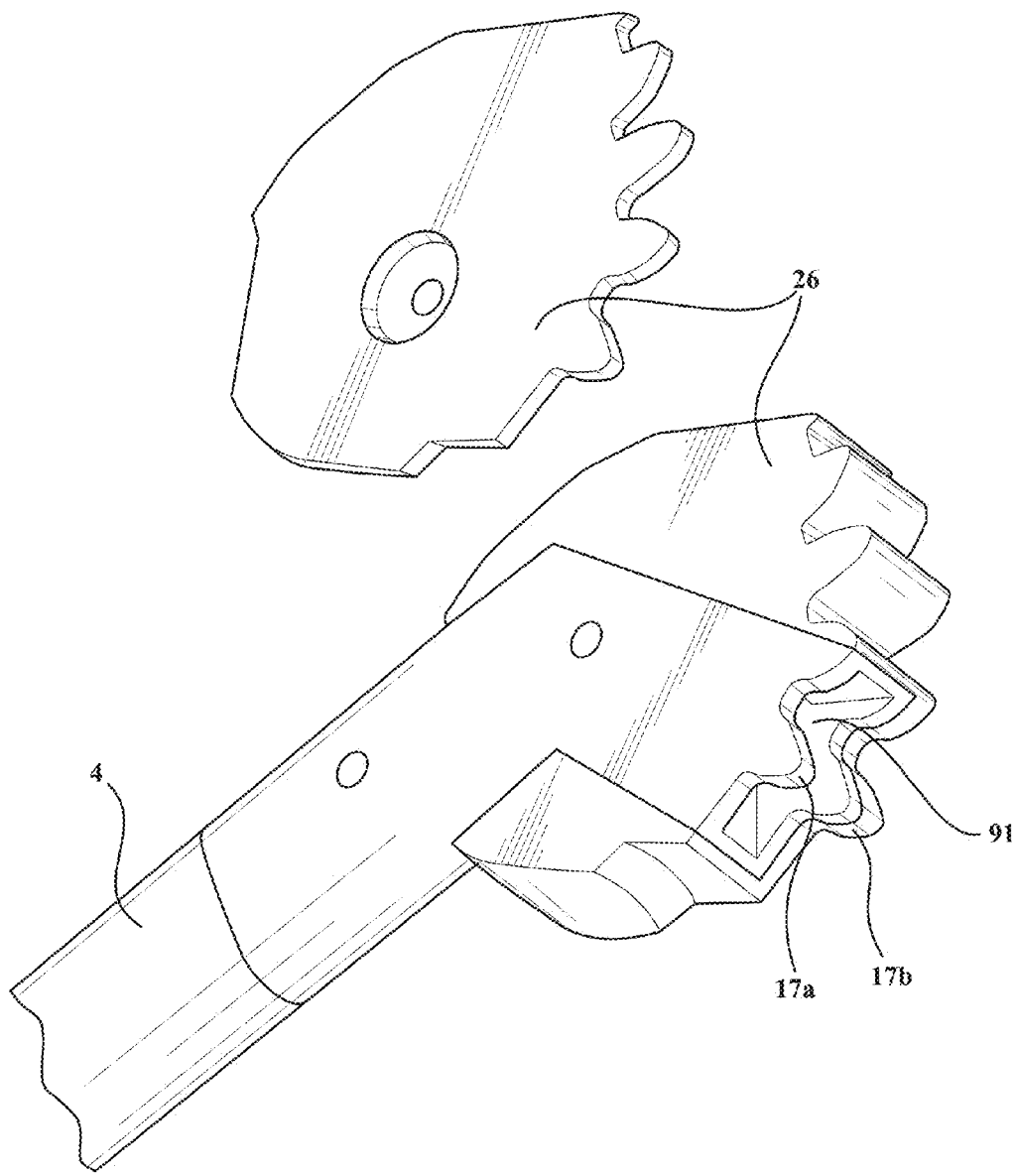
FIG. 7 is an exploded view of the gear component with receptor and gear locking tabs.

The receptor 91 is positioned within gear component 26 (See FIG. 7). The receptor 91 further extends to become the front wheel support 4. On both sides of receptor 91 are the gear locking tabs 17a, 17b. The gear locking tabs 17a, 17b are larger than the rest of the gear teeth of gear component 26. The protrusion bar 90 and receptor 91 can be of any size, shape, and any material such as plastic, metal, or the combination of both. The receptor 91 and gear component 26 can be made into one piece. The protrusion bar 90 and gear component 25 can also be made into one piece.

The receptor 91 has a hollow section that can be a groove or a slot to allow the passing through of protrusion bar 90 during gear movement. The depth and width of the receptor 91 is designed to provide a good fit with protrusion bar 90. The receptor 91 and protrusion bar 90 can be positioned at any location on each gear component 25, 26 respectively for smooth engagement during gear movement.

The locking system 80 consists of a spring loaded piston 12 connected to a stopper 14 at one end. The stopper 14 can be made of a lug, a bar, or a tab; and is positioned in order to constrain the movements of both gear components 25, 26.

When folding, the stopper 14 on the locking system 80 is retracted away from the protrusion bar 90, thereby freeing both gear components 25, 26 to rotate with the influence of force gravity pulling and collapsing of the front wheel support 2 and push handle support 4. In the diagram depicted in FIG. 2, each push handle support 4 that is connected to the push handle 5 rotates counterclockwise at the axis of the folding mechanism 6, while each front wheel support 2 connected to the left and right the front wheels rotates clockwise at the axis of the folding mechanism 6. Within the folding mechanism 6, the gear components 25, 26 move simultaneously while sequence of teeth on the each gear rotate in the opposite circular direction. As this movement proceeds, the protrusion bar 90 passes through the receptor 91 smoothly, allowing the stroller to continue folding. Thus, the final result is a folded stroller depicted in FIG. 4.

Figure 3:
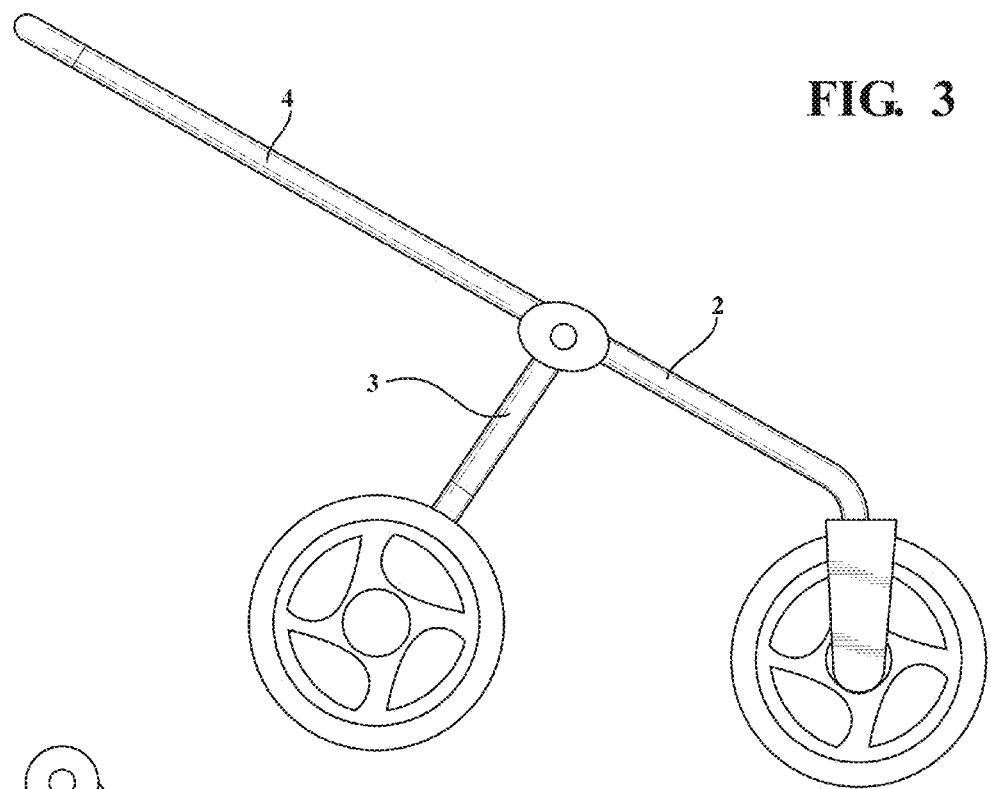
FIG. 3 is a side elevation view of the stroller frame of FIG. 2.
Figure 4:
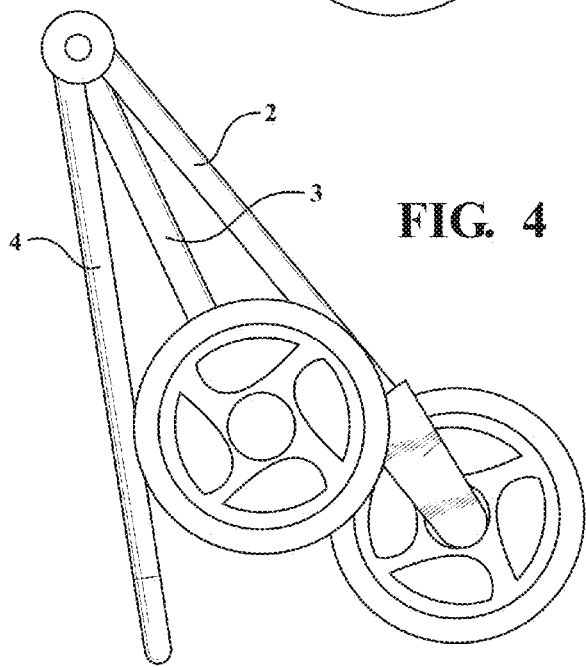
FIG. 4 is a side elevation view of the stroller frame of FIG. 3 shown in fully folded state.
Figure 9:
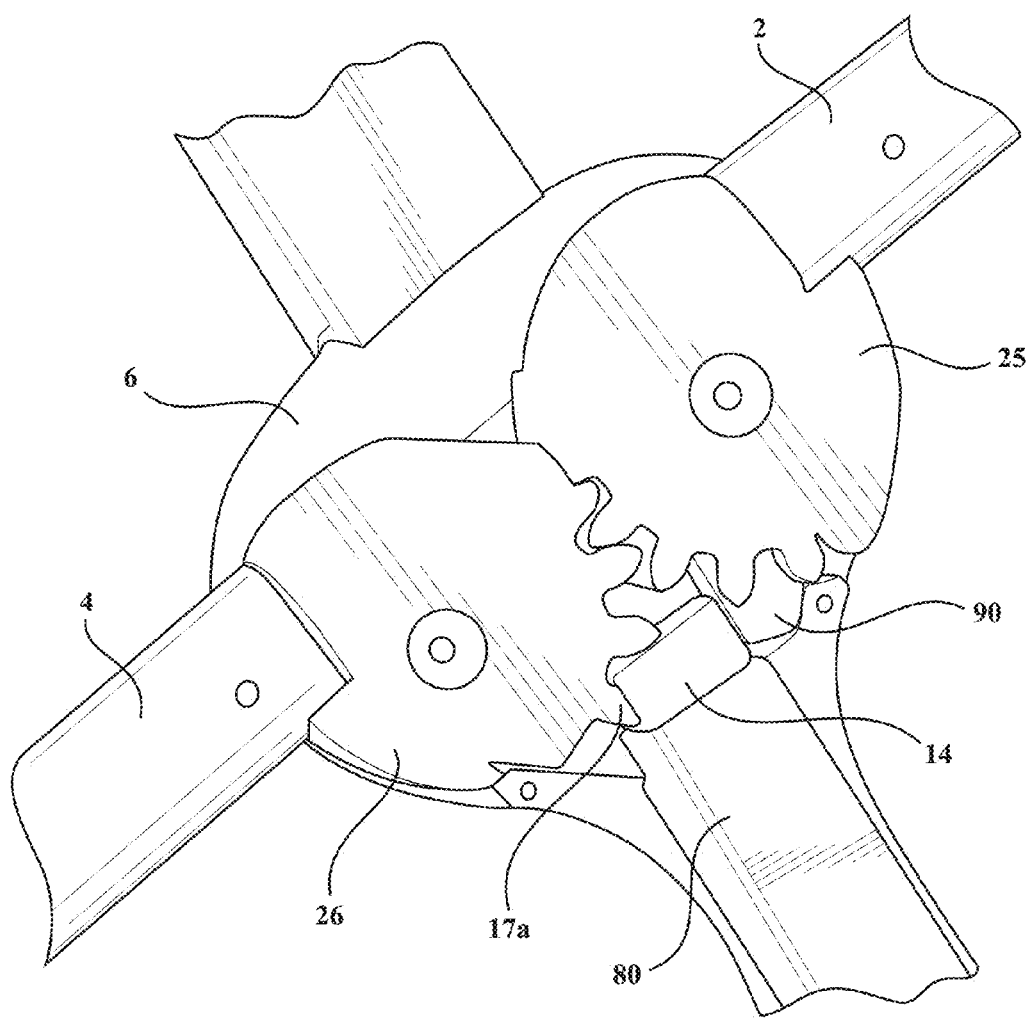
FIG. 9 is an enlarged fragmentary view of the folding mechanism of present invention with its outer housing removed and in an unfolded state.

The stroller, in the unfolded position depicted in FIG. 3, has the front wheel support 2 and posh handle support 4 aligned in a straight line. During the unfolding process, each extension of the gear components 25, 26 moves away from, each other. With sequence of teeth on each the gear components 25, 26 rotates in the opposite direction and the protrusion bar 90 passes through the receptor 91 smoothly, once again, now in the opposite direction, until the movements of the gears are halted by the end of the sequencing of the gear teeth. At this moment, the stopper 14, with the release of the loaded tension in the locking system 80, falls in between the protrusion bar 90 and the gear locking tabs 17a, 17b of receptor 91, halting the rotation of the gear components 25, 26 from reversing their rotation to fold. As an example in FIG. 9, the stopper 14 falls between the protrusion bar 90 and gear locking tabs 17a, 17b halting the rotation of the gear components 25, 26. The remaining tension from in the locking system 80 maintains the stoppers 14 in contact with the protrusion bar 90 and gear locking tabs 17a, 17b preventing the front wheel support 2 and push handle support 4 from folding. It is to be noted that the gear locking tabs 17a, 17b and gear component 26 can be made in one piece.

The retraction of locking system 80 can be achieved by lifting up the pull bar or lever 19. The lever 19 is connected to the locking system via pin 18 (See FIG. 10). The position of the lever 19 can be extended away from the locking system 80 to be in closer proximity to the stroller user by using means such as cable wires on Socking system 80 and levers 19 to control the locking operation. The stroller will fold only when both levers 19 on each side of the stroller, are lifted up simultaneously. This can be achieved by connecting both levers 19 on each side of the stroller with a handle strap.

The invention claimed is:

1. A folding mechanism for a stroller comprising;
    a first gear component having a first surface and a second surface, the first and second surfaces being parallel, the first gear component having a plurality of teeth formed between the first and second surfaces of the first gear component, the first gear component having a first axis of rotation, the first gear component having at least one protrusion bar, the at least one protrusion bar being located adjacent one of the plurality of teeth of the first gear component and in between the first and second surfaces of the first gear component;
    a second gear component having a first surface and a second surface, the first and second surfaces of the second gear component being parallel, the second gear component having a plurality of teeth formed between the first and second surfaces of the second gear component, the second gear component having a second axis of rotation laterally spaced from the axis of the first gear component, the second gear component having at least one receptor cavity extending into the second gear component in between two of the plurality of teeth of the second gear component, wherein one of the first and second gear components connects with a bar and further extends to become a front wheel support of the stroller and the other one of the first and second gear components connects with a bar and further extends to become a push handle support of the stroller; and
    a locking system for constraining the movement of the first and second gear components, the at least one protrusion bar configured to fit within the at least one receptor cavity when the first and second gear components are rotated along the respective axis of rotation.

2. The folding mechanism according to claim 1, wherein the locking system further connects to a rear wheel support of the stroller.

3. The folding mechanism according to claim 1, wherein the locking system comprises at least one tension loaded piston.

4. The folding mechanism in claim 1, the locking system further including at least one stopper and wherein the protrusion bar further engages with the at least one stopper of the locking system.

5. The folding mechanism according to the claim 4, wherein the receptor cavity further comprises at least one gear locking tab that further engages with the at least one stopper.

6. The folding mechanism according to the claim 1, wherein the protrusion bar and the first gear component is one piece.

7. The folding mechanism according to the claim 1, wherein the receptor cavity and the second gear component is one piece.

8. A folding mechanism for a stroller comprising;
    a first gear component having a first surface and a second surface, the first and second surfaces being parallel, the first gear component having a plurality of teeth formed between the first and second surfaces of the first gear component and a first axis of rotation; wherein the first gear component connects with a bar and further extends to become a front wheel support of the stroller;
    a second gear component having a first surface and a second surface, the first and second surfaces of the second gear component being parallel, the second gear component having a plurality of teeth formed between the first and second surfaces of the second gear component, the second gear component having a second axis of rotation laterally spaced from the axis of the first gear component, and wherein the second gear component connects with a second bar and further extends to become a push handle support of the stroller;
    at least one protrusion bar, wherein the at least one protrusion bar connects to the first gear component and further engages with at least one stopper of a locking system, the locking system configured to constrain movement of the gear components, the at least one protrusion bar being located adjacent one of the plurality of teeth of the first gear component and in between the first and second surfaces of the first gear component;

at least one receptor cavity extending into the second gear component and being located in between two of the plurality of teeth of the second gear component, wherein the receptor cavity connects to the at least one gear component, the protrusion bar configured to fit within the receptor cavity when the first and second gear components are rotated along the respective axis of rotation; and at least one gear locking tab, wherein the locking tab connects to the second gear component and further engages with the at least one stopper.

9. The folding mechanism in claim 8, wherein the locking system connects to a rear wheel support of the stroller.

10. The folding mechanism according to the claim 8, wherein the at least one protrusion bar and the first gear component is one piece.

11. The folding mechanism according to the claim 8, wherein the at least one receptor cavity and the second gear component is one piece.

12. The folding mechanism according to the claim 8, wherein the at least one gear locking tab and the second gear component is one piece.

13. The folding mechanism according to the claim 8, wherein the at least one protrusion bar is larger than the gear teeth of the first gear component, the receptor cavity is configured to allow for the movement of the protrusion bar through the receptor cavity during the folding and unfolding of the mechanism.

14. The folding mechanism according to the claim 8, wherein the at least one of gear locking tab is larger than the gear teeth of the second gear component.

15. A folding mechanism for a stroller comprising;

a first gear component having a first surface and a second surface, the first and second surfaces being parallel, the first gear component having a plurality of teeth, and an axis of rotation, wherein the first gear component connects with a bar and further extends to become a front wheel support of the stroller;

a second gear component having a first surface and a second surface, the first and second surfaces of the second gear component being parallel, the second gear component having a plurality of teeth formed between the first and second surfaces of the second gear component, the second gear component having a second axis of rotation laterally spaced from the axis of the first gear component, and wherein the second gear component connects with a second bar and further extends to become a push handle support of the stroller;

at least one protrusion bar being located adjacent one of the plurality of teeth of the first gear component and in between the first and second surfaces of the first gear component, wherein the at least one protrusion bar connects to the first gear component and further engages with at least one stopper of a locking system connected to a rear wheel support of the stroller, the locking system configured to constrain movement of the gear components; and at least one receptor cavity extending into the second gear component and being located in between two of the plurality of teeth of the second gear component, wherein the at least one receptor cavity comprises at least one gear locking tab and further engages with the at least stopper, and the at least one stopper being connected to the locking system, the protrusion bar configured to fit within the receptor cavity when the first and second gear components are rotated along the respective axis of rotation.

16. The folding mechanism in claim 15, wherein the locking system comprises at least one spring loaded piston.

17. The folding mechanism according to the claim 15, wherein said protrusion bar and the first gear component is one piece.

18. The folding mechanism according to the claim 15, wherein the receptor cavity and gear component is one piece.

19. The folding mechanism according to the claim 15, wherein the at least one protrusion bar is larger than the gear teeth of the first gear component, the receptor cavity configured to allow for the movement of the protrusion bar through the receptor cavity during the folding and unfolding of the mechanism.

20. The folding mechanism according to the claim 15, wherein at least one of the at least one gear locking tabs of the receptor cavity is larger than the plurality of gear teeth of the second gear component.

\* \* \* \* \*